United States Patent [19]

Samuels

[11] 4,027,791
[45] June 7, 1977

[54] GAS-ENERGIZED LIQUID TRANSFER AND CONTROL SYSTEM

[76] Inventor: W. Edward Samuels, 402 W. Blackbeard Road, Wilmington, N.C. 28401

[22] Filed: Feb. 12, 1976

[21] Appl. No.: 657,446

Related U.S. Application Data

[62] Division of Ser. No. 482,338, June 24, 1974, Pat. No. 3,938,554.

[52] U.S. Cl. .............................. 222/396; 222/482; 141/DIG. 2
[51] Int. Cl.² ....................................... B65D 83/14
[58] Field of Search .......... 137/625.6, 625.66, 315, 137/625.61; 91/47; 251/257, 28, 61.3, 46, DIG. 4; 141/242, 243, 244, 245, 236, DIG. 2, 63–66, 4–7; 62/45, 50, 51, 514; 222/396, 482

[56] References Cited

UNITED STATES PATENTS 3,146,807  9/1964  Tatibana .......................... 141/244

*Primary Examiner*—Houston S. Bell, Jr.
*Attorney, Agent, or Firm*—P. D. Golrick

[57] ABSTRACT

A system for transfer of liquid from a storage vessel to and maintaining at least a minimum level in a receiver or plurality of receivers, using the gas arising from liquid vaporized into the gas space above the liquid in the storage vessel to expel liquid through a valve energized by the gas and responsive to gas-back pressure type probe means utilizing the gas. A clustering manifold device applied as a vessel closure provides a liquid manifold valve for four controller devices valving liquid to respective receivers, and a gas manifold provides gas supply connections for supplying gas at pre-established pressure to energize respective controller devices and associated gas probes.

5 Claims, 1 Drawing Figure

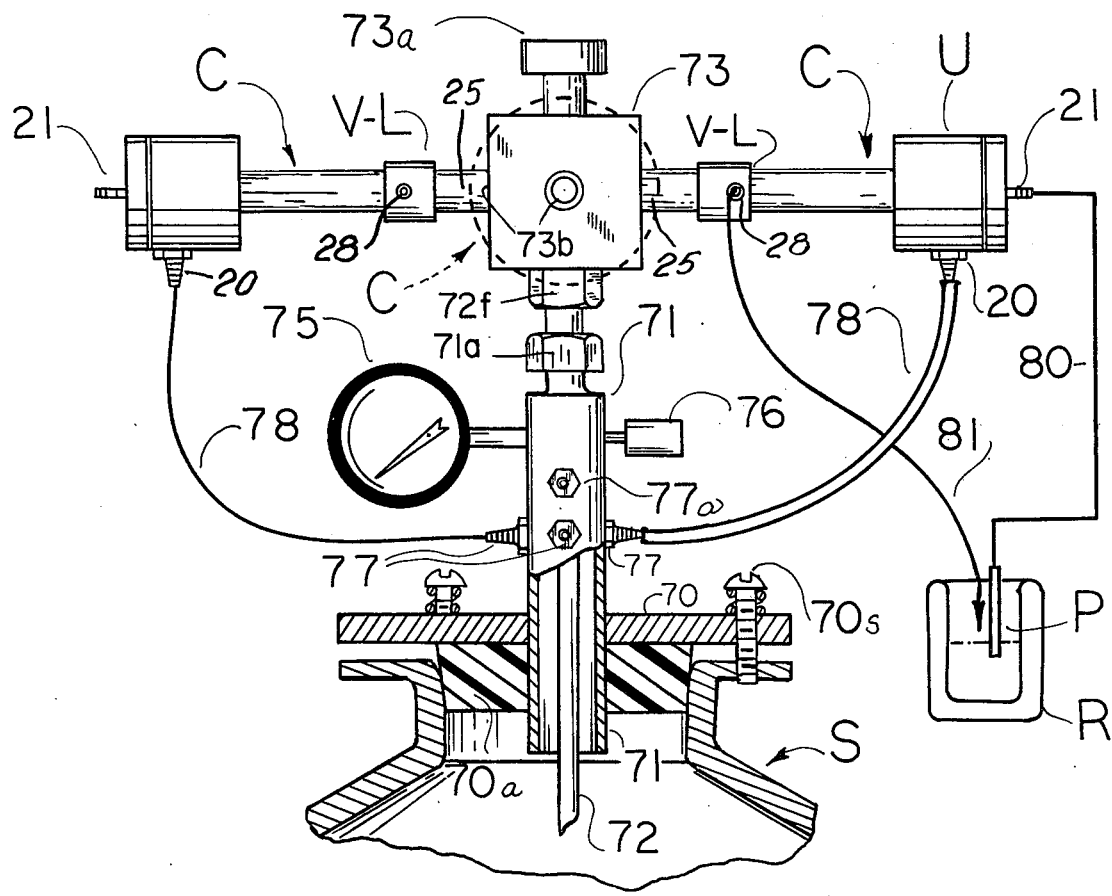

GAS-ENERGIZED LIQUID TRANSFER AND CONTROL SYSTEM

This application is a division of copending application Ser. No. 482,338, filed June 24, 1974 now U.S. Pat. No. 3,938,554, granted Feb. 17, 1976.

The present invention relates to a controller system particularly useful in controlling transfer of volatile or non-volatile liquids, but especially advantageous for volatile cryogenic liquids, such as liquid air, liquified natural gas, nitrogen, oxygen, hydrogen or helium to be transferred intermittently from a source vessel usually to a plurality of receiving vessels where a certain level of liquid is to be maintained within a certain range.

The present invention will be discussed in terms of the use of and handling of liquid nitrogen, though it is to be understood that it may have application in other environments and with other volatile, especially cryogenic, liquids, with certain aspects of the invention also having utility with respect to operations even with non-volatile liquids.

In the operations utilizing cryogenic liquids it is often necessary to maintain a certain liquid level or level range in a receiving vessel where the level is continuously dropping due to evaporation. Thus in high vacuum equipment, liquid nitrogen may have to be maintained in a Dewar flask surrounding a vapor trap on the vacuum line, requiring constant operator attention to replenish the liquid nitrogen as needed.

Obvious and well known risks, inconveniences, and other disadvantages of manual handling of flasks for transferring any cryogenic liquid have led to development of automatic systems to deliver the liquid as needed to maintain the desired receiver minimum level.

Because of the extremely low liquid temperatures, ordinary pumps and other components of glass, metal and other common materials are less desirably used; and therefore transfer systems are common wherein a gas from a pressurized source, such as nitrogen from a pressure cylinder, is applied through appropriate control and reducing valves to the cryogenic liquid surfaces in a closed source vessel to expel it through a delivery line to the receiver. Now this has been done at times under manual control, and also by liquid level control means sensing the level in the receiver, to actuate automatically a valve in the transfer-powering gas line; or where the liquid source is continuously gas-pressurized, to operate a solenoidal valve in the liquid delivery line.

Such non-manual transfer expedients have been attended by various awkward or undesirable features, as in relatively high costs or complexity, in required external power sources, such as an electric power or a gas pressurizing source; and with certain liquified gases, especially liquid hydrogen or oxygen, in some aspects of required construction or components, or in the very use of electric power, which should as far as possible be avoided from safety considerations.

In brief, the present invention facilitates use of a plurality of units each incorporating a gas-energized liquid controller and valving means for dispensing a cryogenic liquid to a respective receiver and maintaining therein at least a certain minimum level. The vapor pressure of the gas deriving from the evaporating liquid in the storage vessel is used as a liquid "pumping" or propelling power source and also as an operating medium and power source in the liquid level sensing and liquid delivery control system, thus obviating need of any external pressurized gas source or electric power source to move the liquid, or even of use of the electric power in the control powering system; the more remote power source, of course, being the heat of the environment.

It is then the general object of the present invention to provide an improved gas-energized liquid transfer system.

Another object is to provide a compact and convenient system utilizing gas-energized-sensor controlled and gas operated valving units for automatically dispensing volatile especially cryogenic liquids to corresponding receivers where a respective certain liquid level or range is to be maintained.

Another object is to provide a controller system of the type described which is responsive to back pressure signals of a gas type level sensing probe to initiate and terminate liquid transfer flow.

A still further object is the provision of a manifold for controllers of the type described which when used in a self-powered transfer system (i.e., with a portion of the evaporating liquid used as both a liquid-moving power supply and as a power supply for the control system) is adapted to close clustering of a plurality of controllers on one supply vessel serving several receivers; and to provide other cluster-forming components of convenient form.

Other objects and advantages will appear from the following description and the drawing, which is a somewhat generalized representation of a fluidic sensing and cryogenic fluid supply system utilizing plural controllers clustered on a header or manifold arrangement for controlling cryogenic fluid delivery from one source vessel to a plurality of traps or other receiver vessels at use sites.

GENERAL ORGANIZATION

By the drawing-represented embodiment of the invention, liquid nitrogen from a single Dewar storage vessel S is supplied through a clustering manifold device, affording overall system "on" and "shut off" liquid valving, to a plurality of controller devices C each controlling liquid delivery through a line 81 from a controller liquid outlet 28 to a respective receiver vessel such as vessel R where the liquid nitrogen level is sensed by a sensor gas probe P. Energizing gas is also supplied through the clustering manifold device to respective units C through lines 78, for internal valve powering use and also to supply the respective probe line 80 attached to a sensing gas probe connection spud 21. Each controller device C may be, for example, a liquid valving type unit as disclosed for FIG. 1 in the aforementioned U.S. Pat. NO. 3,938,554, and comprises a larger conroller and valve-operating section U of fluidic amplifier type and an associated liquid nitrogen valving section V-L.

LIQUID VALVING CLUSTERING MANIFOLD

In the clustering manifold, a disc base plate 70 is secured to a Dewar flask casing neck flange by screws 70s through interposed bias springs to clamp the rubber stopper 70a to a supply flask represented at S in a fragmentary and generalized manner. A gas supply manifold tube 71, centrally penetrating disc 70 and also the stopper 70a to terminate in gas-tight communication with the flask gas space, is connected and sealed gas-tight at its upper end about, and coaxially supports, a smaller diameter, bottom-reaching liquid supply riser tube 72. The riser top end is connected by threaded coupling means 72f to the bottom inlet of a manifold type liquid supply shut-off valve 73. A longitudinally adjustable sealed connection preferably is made by a tubing connecting type arrangement at 71a including a male threaded part on the end of 71, a female-threaded collar thereon and a gripping sealing ferrule therebetween, by which riser tube 72 passed therethrough can be releasably gripped and sealed at a selected position without swaging the ferrule into a permanent connection.

Valve 73, serving as a liquid manifold here has four threaded lateral outlets to directly receive the respective liquid inlet ends 25 of and thereby mount respective units C. For assembly simplicity, the liquid inlet end of valve 73 is male-threaded to couple with a female connector fitting 72f on the end of the liquid supply riser tube.

On the length gas tube 71 above base plate or disc 70, hence below valve 73, there are threaded and gasketed or otherwise secured into diametrically located holes a pressure gauge 75 and a settable poppet or pressure-establishing relief valve 76, typically set for say 4 to 6 psig, but desirably settable up to about 25 psig. At a lower level, four equi-angularly spaced tubing connection spuds 77 are similarly threaded and gasketed to afford respective gas take-off points for tubing 78 to the energizing gas supply inlet connection spuds 20 of respective controllers C. Advantageously an ancillary similar spud 77a is provided by which a newly connected supply Dewar may be immediately pressurized by connection with an external gas source for operation without waiting for the flask to attain operating gas pressure level by internal evaporation. Preferably the connection elements 77, 77a are known assemblies each including a valve shutting off gas flow when not in use, such as a "quick connect" type fitting.

This arrangement thus results in a close cluster of the controllers and their gas supply tubing about the top of the Dewar liquid supply vessel S, with the liquid shutoff valve handle easily accessible for hand manipulation. From each unit C in the cluster to each point of use, there runs a sensor gas line 80 for a sensor probe P and also a liquid delivery line or tube 81 to a respective receiver vessel R.

The cluster hardware unit above described, namely, manifold liquid valve 73, liquid riser tube 72 with gas manifold tube 71 and its associated gauge 75, regulator relief valve 76 and connectors 77, 77a, can be simply connected to a Dewar in which the closure has a tubular discharge nipple, by the simple expedient of a short rubber tube connector clamped to the bottom of gas tube 71 and to the top of the nipple; the latter having the riser tube 72 inserted therethrough into the flask. On the other hand, where the flask closure is a rubber or other elastomeric plug or stopper radially expanded to a circumferential seal with the flask mouth by axial compression between end plates developed by a nut and an axial through-bolt, the gas tube 71 in which 72 is coaxial may extend into or through and be sealed to a bore through the bolt or may be an integral part of the bolt structure.

OPERATION

With the supply vessel stopper gas-tight, under normal heat leakage conditions and hence nitrogen evaporation, gas pressure builds up to the poppet valve setting, say 6 psig, in the free gas space above the liquid surface, thus applying gas through the gas manifold and respective lines 78 to each controller gas supply connection spud 20 at 6 psig. Also, the vessel gas pressure is tending to force liquid up the riser tube 72 and through the liquid supply manifold valve 73, when opened, to the liquid inlet end 25 of each unit C which functions independently of the other units C. However, if an appropriate separate gas supply is available, the source may be conveniently pressurized immediately to operating level by a connection to the ancillary spud 77a.

In each unit C, energizing gas continually supplied by a tube 78 is delivered through internal passages from energizing gas supply spud 20 to sensing gas probe connection spud 21, conveinently at a rate of 10 cc/min. or less established by an internal fluidic resistor, and thence by tubing 80 to the gas type sensor probe P in the respective receiving vessel R. The energizing gas is also used internally of each unit C by the controller section U responding to probe gas back pressure signals to operate its liquid valving section V-L. When the unit is transferring liquid, its gas consumption would, of course, be greater. With valve 73 open, liquid nitrogen is delivered to each such vessel R as needed from the supply vessel S through the open valve 73, the valve section V-L and delivery tubing 81 of the corresponding unit C, into vessel R where, by the cooperative action of the controller unit C and probe P, liquid nitrogen is to be maintained within a level range or at a desired level, the region or position of which is established by the selected position of the probe open lower end.

What is claimed is:

1. A manifold device for cluster mounting, at the mouth of a Dewar flask or like storage vessel for cryogenic liquid, a plurality of N gas-energized fluidic control controller units each including a liquid valving section having a liquid inlet end formation and a liquid outlet and a gas-energized control section having a gas inlet connection, and comprising:

closure means for the vessel mouth;
   a gas manifold tube having one end extending through said closure means for communication with gas space having the normal liquid fill of the vessel, and the other end projecting upwardly beyond the closure means;
   a liquid riser tube having its upper end sealed gas-tight to and projecting from the upper end of the manifold tube, and extending downwardly through the manifold tube and adapted to reach into a liquid-occupied space of the vessel;
   a liquid shutoff valve having
   an inlet portion of its body connected to said riser tube,
   an N-plurality of connection means on the valve body respectively adapted to have a liquid inlet end formation of a respective controller unit secured supportedly thereto;
   said gas manifold tube having on its upwardly extending portion
   a plurality of at least N gas outlet connection fittings whereby the respective energizing gas connections of a plurality of N units mounted on said shutoff valve are connectable to the Dewar flask gas region;
   and a pressure regulating pop-off valve communicating by a passageway through said closure means with said gas space.

2. A manifold device as described in claim 1, wherein said pop-off valve is mounted on the gas manifold tube and the gas manifold tube provides said passageway; and a gas pressure gauge is connected to the gas space by the gas manifold tube.

3. A manifold device as described in claim 1, wherein said gas outlet connection fittings are check valve type gas connection fittings each closed against gas escape except when a respective gas discharge line is connected thereto.

4. A manifold device as described in the claim 1, having a further gas line connection fitting of a check valve type on said manifold tube, whereby upon initial installation of the manifold device on a vessel, the vessel gas space may be connected to an independent pressurized gas source to be immediately brought to operating pressure desired from said source, without delay for pressure build-up by evaporation from the cryogenic liquid contained therein.

5. A manifold device as described in claim 1, wherein said closure means includes a base plate adapted to a stopper-sealed connection with the vessel mouth and having said one end of the gas manifold tube secured thereto and opening therethrough to said gas space; and said connection means face laterally outwardly on the valve body.

* * * * *